Dec. 15, 1925.
C. A. STORCK
SPRING
Filed Oct. 25, 1923
1,566,173
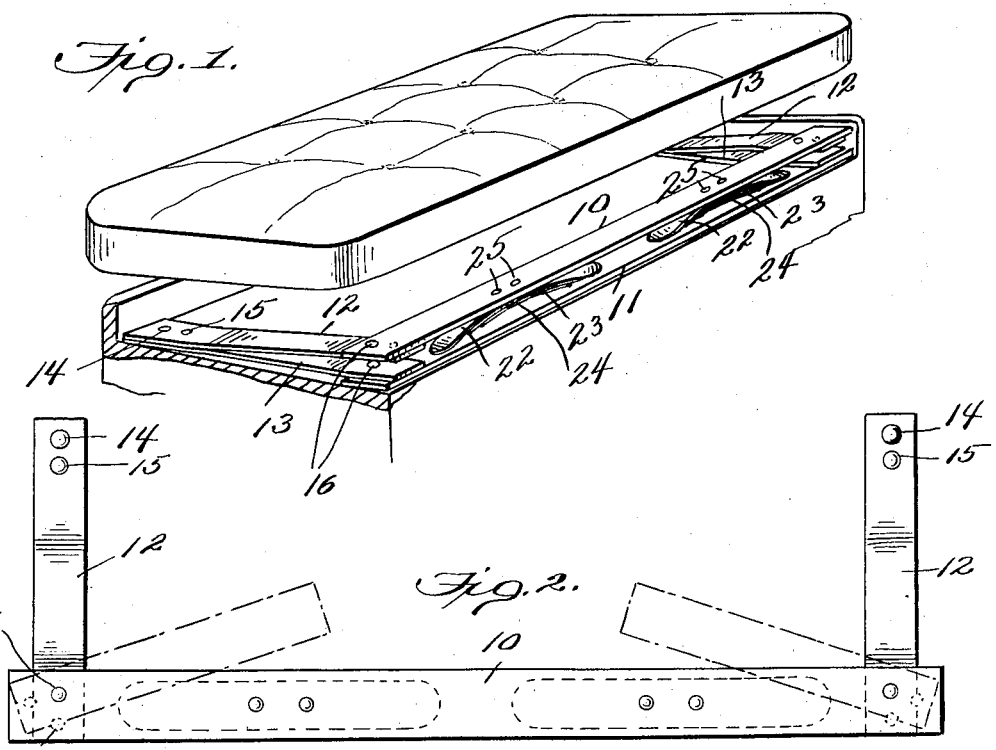
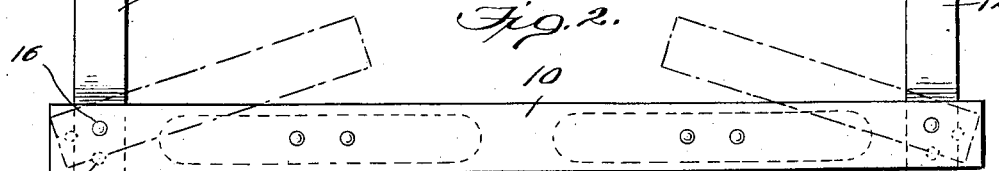
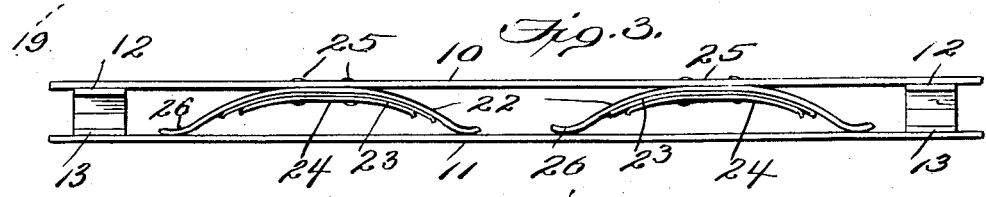
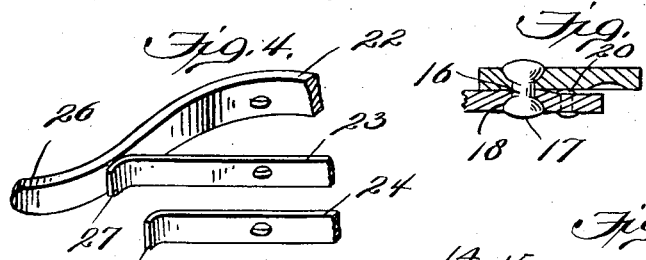
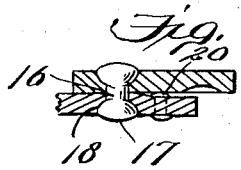
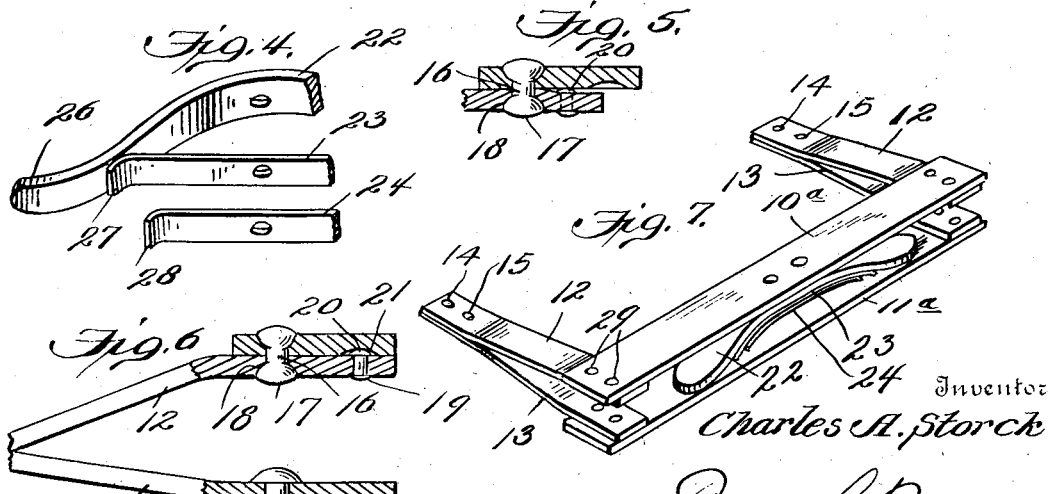

Patented Dec. 15, 1925.

1,566,173

UNITED STATES PATENT OFFICE.

CHARLES A. STORCK, OF BUFFALO, NEW YORK.

SPRING.

Application filed October 25, 1923. Serial No. 670,757.

*To all whom it may concern:*

Be it known that I, CHARLES A. STORCK, a citizen of the United States, residing at Buffalo, in the county of Erie and State of New York, have invented new and useful Improvements in Springs, of which the following is a specification.

The present invention relates to devices for giving resiliency to the cushion of a vehicle or to give auxiliary resilience to said cushion.

An object of the invention is to provide a device which may be used in connection with the cushion of a vehicle, to add resiliency thereto and which may be inserted under said cushion or removed at will.

A further object of the invention is to so construct such a device that it may be folded into a compact article for transportation when not in use.

Another object of the invention is to so construct the parts of the device as to minimize frictional wear and deterioration thereof and so that the resilient parts will have freedom of movement in expanding and contracting.

Other objects and advantages will appear in the following specification and I do not wish to be limited to the exact construction herein illustrated, except as I shall be limited by the claims appended hereto.

In the drawings which form part of the specification;

Figure 1 is a perspective view showing my device as used on the seat-box of a vehicle, below the cushion and showing the cushion displaced therefrom in order to more clearly illustrate the use of the device.

Figure 2 is a plan view of my auxiliary member showing the foldable parts as in use, in full lines, and as folded, for storing or transportation, in dotted lines.

Figure 3 is a front elevation of the device showing the relation of the springs to the frame members.

Figure 4 is a detail exploded fragmentary view of one end of one of the springs of my device, showing the shape of the various elements of the spring member before assembling.

Figure 5 is a detail fragmentary view showing the connection between side members and the transverse members, the side members being collapsed.

Figure 6 shows the connection of the transverse members to the side members with the locking rivet head in place to hold the side members and transverse members in position for use.

Figure 7 is a perspective view showing the device built up with a single set of springs between the transverse members and of a size to be used in connection with divided cushions.

Referring to the drawings in detail, the invention comprises a frame including the transverse members 10 and 11 which preferably consist of steel strips attached at their ends to side members 12 and 13, the latter being connected together at their opposite ends by rivets 14 and 15, the side members normally diverging from adjacent the point of connection with each other toward the transverse members. The side members are made preferably of resilient material, such as steel and are connected to the transverse members by rivets 16, the heads 17 of which have rounded under surfaces adapted to fit in and cooperate with similarly shaped depressions 18 formed both in the transverse members and in the side members as shown in Figure 6, to facilitate folding of the side members on the transverse members. This arrangement of connecting rivets allows for a certain degree of play between the side members and the transverse members when the side members are depressed and when they are being turned to or from folded position.

In order to hold the side members in proper relation with the transverse members for use in connection with a cushion as above set forth, supplemental rivets 19 are provided, extending through the upper side members 12, said supplemental rivets having one head 20 thereof lying beneath the upper transverse member 10, said member being provided with depressions 21 in position to receive said head when the side members are at right angles to the transverse members and the device is set up for use. By this construction it will be readily seen that the side members may be collapsed when desired and the device may be stored in a very small space.

Attached to the transverse member 10 are resilient members 22 preferably of the leaf-spring type, said springs being normally curved as shown in Figure 3 and adapted to resist pressure exerted thereon. Connected with springs 22 are supplemental spring members 23 and 24 which are normally straight, as shown in Figure 4 and which are bent into shape to conform with spring 22. The bending of these springs is made against their resilient force, the members 23 and 24 tending to straighten out as shown in Fig. 4. Consequently the springs 23 and 24 tend to resist the thrust of the spring 22 and operate in the opposite direction from the direction of operation of said spring 22. The connection between the springs 22 and the member 10 and between said members and the members 23 and 24 may be by any suitable means, such as rivets 25, and in order to minimize the frictional wear between the members 22, 23 and 24 and between the member 22 and the member 11, the springs are made curved at their ends as shown at 26, 27 and 28 respectively. By the above arrangement of the springs 23 and 24 in relation to the springs 22 provision is made for the absorption of a large percentage of the recoil or rebound of the main spring 22.

In the embodiment of the invention shown in Figure 7 the transverse members 10ª and 11ª are only half the length of the members 10 and 11 shown in Figures 1, 2 and 3 and are adapted for use under a cushion extending only half the length of the seat. In the device as shown in Figures 1, 2 and 3 it will be noted that there are provided two sets of springs 22, 23 and 24, whereas in Figure 7 there is provided only one set of such springs. It will be understood that one set only may be used in the device as shown in Figures 1, 2 and 3, the length of the spring being accordingly of greater length than those shown, or two sets may be used in the device as shown in Figure 7 as found convenient and desirable. It will also be noted that the side members 12 and 13 are rigidly connected with the respective transverse members by pairs of rivets 29 which is an alternative construction from that shown in Figures 1, 2 and 3.

From the foregoing description it will appear that I have provided a device which is readily collapsible so that the parts will lie in compact relation to each other and which may be used under the cushion of the seat of an automobile or other similar vehicles, and which may be removed or replaced at will when added resiliency is desired or is to be dispensed with.

Having described my invention what I claim is:

1. An auxiliary spring device for seat cushions comprising a frame including spaced front members, side members consisting of resilient metal strips secured together at one end and spaced at the other end to engage the spaced front members, said side members being secured angularly to said front members, and a leaf spring between said front members extending in a direction longitudinally thereof.

2. An auxiliary spring device for seat cushions comprising a frame having spaced front members, resilient side members each comprising a pair of resilient strips in superposed relation, each of said strips being pivotally secured adjacent one of its ends to one of said front members and normally angularly disposed relatively to said front member, and leaf springs carried between said front members and extending in a direction longitudinally thereof.

3. An auxiliary spring device for seat cushions comprising a frame having spaced front members, resilient side members each comprising a pair of resilient strips in superposed relation, each of said strips being connected adjacent one of its ends to one of said front members in foldable relation to the latter and normally angularly disposed with respect to said front member, leaf springs carried between said front members and extending in a direction longitudinally thereof, and means for latching said side members in their normal angular position.

In testimony whereof I have hereunto set my hand.

CHARLES A. STORCK.